(12) United States Patent
Douglas

(10) Patent No.: US 9,095,971 B1
(45) Date of Patent: Aug. 4, 2015

(54) HANDLE GRIPPING SYSTEM HAVING INNER RIDGES AND CHANNELS

(71) Applicant: Richard Douglas, Tucson, AZ (US)

(72) Inventor: Richard Douglas, Tucson, AZ (US)

( * ) Notice: Subject to any disclaimer, the term of this patent is extended or adjusted under 35 U.S.C. 154(b) by 0 days.

(21) Appl. No.: 14/326,809

(22) Filed: Jul. 9, 2014

Related U.S. Application Data

(63) Continuation-in-part of application No. 13/715,731, filed on Dec. 14, 2012, now Pat. No. 8,800,112.

(60) Provisional application No. 61/576,685, filed on Dec. 16, 2011.

(51) Int. Cl.
*A47J 45/00* (2006.01)
*B25G 3/32* (2006.01)
*B25G 1/10* (2006.01)

(52) U.S. Cl.
CPC ...................... *B25G 1/102* (2013.01)

(58) Field of Classification Search
CPC .... A63B 49/08; A63B 53/14; A63B 59/0014; B62K 21/12; B62K 21/26; A01K 87/08; A46B 5/021; B25G 1/00; B25G 1/10; B25G 1/102; B25G 1/105; B25G 1/125
USPC ........... 16/421, 422, 428, 430, 431, 435, 413, 16/DIG. 12; 294/171, 15, 102.1, 102.2, 294/137, 132; 74/551.9; 15/144.1, 144.2, 15/144.3, 143.1, 145
See application file for complete search history.

(56) References Cited

U.S. PATENT DOCUMENTS

| | | | |
|---|---|---|---|
| 3,072,955 A | | 1/1963 | Mitchell |
| 4,332,119 A | * | 6/1982 | Toews ........................ 52/481.2 |
| 4,563,381 A | * | 1/1986 | Woodland .................... 428/156 |
| 4,670,938 A | * | 6/1987 | Fowlston ........................ 16/225 |
| 4,799,727 A | * | 1/1989 | Robbins et al. .......... 296/107.07 |
| 4,885,820 A | * | 12/1989 | Erceg et al. ..................... 16/225 |
| 5,015,028 A | * | 5/1991 | Bonnett ..................... 160/231.1 |
| 5,056,945 A | | 10/1991 | Klodt |
| 5,083,825 A | | 1/1992 | Bystrom et al. |
| 5,105,594 A | * | 4/1992 | Kirchner ........................ 52/239 |
| 5,348,360 A | | 9/1994 | Mencarelli et al. |
| 5,511,445 A | | 4/1996 | Hildebrandt |
| 6,006,403 A | | 12/1999 | Battiato |
| 6,148,482 A | | 11/2000 | Maraman, Jr. |
| 6,234,924 B1 | | 5/2001 | Washburn, Jr. |
| 6,235,134 B1 | | 5/2001 | Mueller |
| 6,974,626 B2 | | 12/2005 | Horacek |
| 7,669,291 B1 | | 3/2010 | Blum |
| 7,861,380 B2 | | 1/2011 | Moore et al. |
| 2004/0050205 A1 | | 3/2004 | Putnam |
| 2011/0232038 A1 | | 9/2011 | Miller |

* cited by examiner

*Primary Examiner* — Chuck Mah

(57) ABSTRACT

A gripping system for a handle features a handle with a handle exterior surface. The system features a flexible gripping wrap with a plurality of outwardly protruding ridges and a plurality of inwardly protruding channels located on a wrap bottom surface. The gripping wrap features a first linear bulge located on a wrap second edge and a second linear bulge located on a wrap fourth edge. For attachment, the first linear bulge is inserted into a first pocket of a linear binding component and the second linear bulge is inserted into a second pocket of the linear binding component. The gripping wrap is located on, and flexibly covers at least a portion of the handle exterior surface.

12 Claims, 4 Drawing Sheets

700

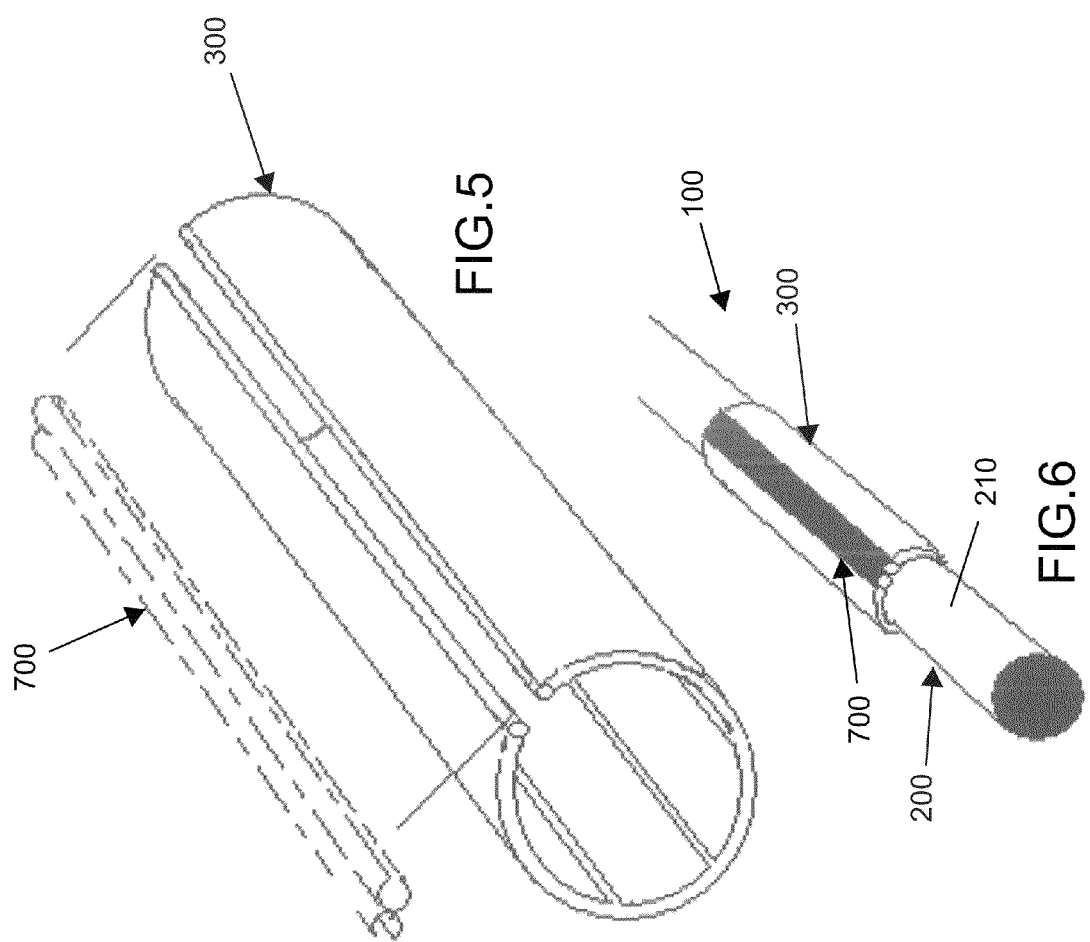

HANDLE GRIPPING SYSTEM HAVING INNER RIDGES AND CHANNELS

CROSS REFERENCE

This application claims priority to U.S. Non-Provisional application Ser. No. 13/715,731 filed Dec. 14, 2012 which is a continuation-in-part, and claims priority to provisional application Ser. No. 61/576,685 filed Dec. 16, 2011, the specification of which is incorporated herein by reference in its entirety.

BACKGROUND OF THE INVENTION

Various embodiments of grips have been used on handles to aid to a user in holding, carrying, pushing, pulling, guiding or steering an object. Sometimes, grips wear out over time and are not replaced due to the difficulty of obtaining the correct replacement for the application. Sometimes makeshift grips are used, but if the grip is not specified or installed correctly, the makeshift grip can lead to discomfort, operational problems, or safety hazards when used. The present invention provides a solution for a new or replacement gripping system for a handle.

SUMMARY

The present invention features a gripping system for a handle. In some embodiments, the system comprises a handle.

In some embodiments, the system comprises an elastomeric flexible gripping wrap having an elongated planar wrap top surface, a planar wrap bottom surface, a wrap thickness from the wrap top surface to the wrap bottom surface, a wrap first edge, a wrap second edge, a wrap third edge opposed to the wrap first edge, and a wrap fourth edge opposed to the wrap second edge.

In some embodiments, the gripping wrap comprises a plurality of outwardly protruding ridges arranged in rows longitudinally located on the wrap bottom surface from the wrap first edge to the wrap third edge, and the height of each of the ridges protruding outwardly from the plane of the wrap bottom surface. In some embodiments, the gripping wrap comprises a plurality of inwardly protruding channels longitudinally located on the wrap bottom surface from the wrap first edge to the wrap third edge, and the depth of each of the channels protruding inwardly from the plane of the wrap bottom surface.

In some embodiments, the gripping wrap comprises a first linear bulge located on the wrap second edge. In some embodiments, the first linear bulge runs at least partial a length of the wrap second edge. In some embodiments, the gripping wrap comprises a second linear bulge located on the wrap fourth edge. In some embodiments, the second linear bulge runs at least partial a length of the wrap fourth edge.

In some embodiments, the system comprises a linear binding component having a binding component first edge and a binding component second edge. In some embodiments, an open first pocket is located on the binding component first edge and an open second pocket is located on the binding component second edge. In some embodiments, the first pocket faces outward. In some embodiments, the second pocket faces outward opposed to the first pocket. In some embodiments, the first pocket is complementary to the structure of the first linear bulge and the second pocket is complementary to the structure of the second linear bulge.

In some embodiments, the gripping wrap is located on and flexibly covers at least a portion of the handle exterior surface. In some embodiments, the first linear bulge is retainably inserted into the first pocket and the second linear bulge is retainably inserted into the second pocket such that the first pocket wraps around and encases the first linear bulge and the second pocket wraps around and encases the second linear bulge. In some embodiments, the gripping wrap is secured via the binding component.

In some embodiments, the gripping system for the handle is adapted to provide gripping stability and comfort for a user.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 5 is a perspective view of the gripping wrap and the binding component of the present invention.

FIG. 6 is a perspective view of the present invention.

DESCRIPTION OF PREFERRED EMBODIMENTS

Figure 1:
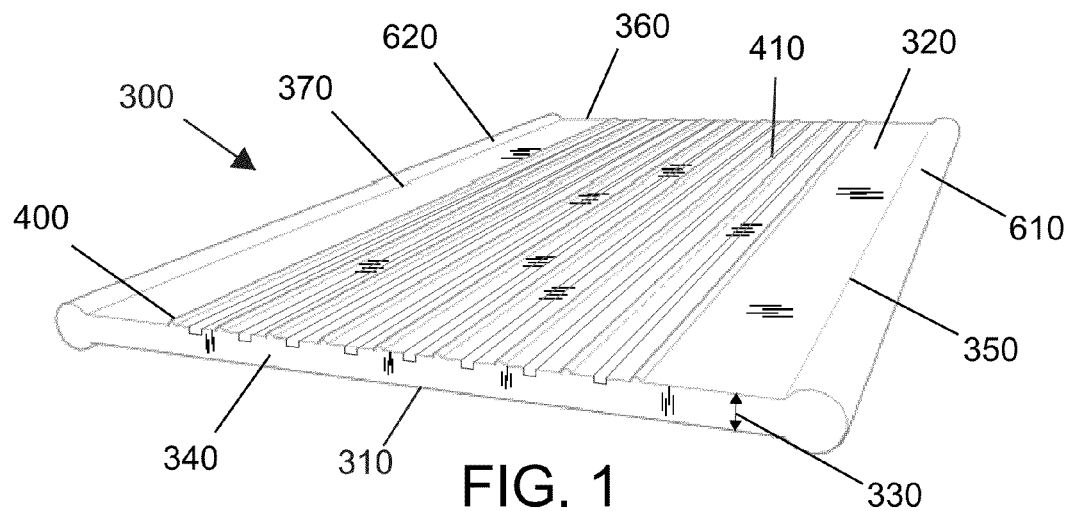
FIG. 1 is a perspective view of the gripping wrap of the present invention.
Figure 2:
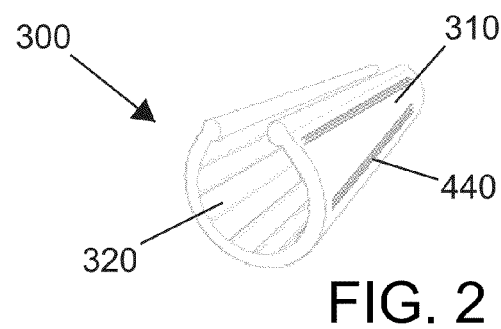
FIG. 2 is a perspective view of the gripping wrap of the present invention.
Figure 3:
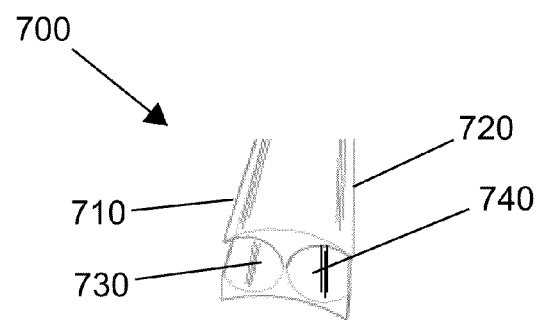
FIG. 3 is perspective view of the binding component of the present invention.
Figure 4:
FIG. 4 is a cross-sectional view in a transverse plane of four embodiments of the binding component of the present invention.
Figure 7C:
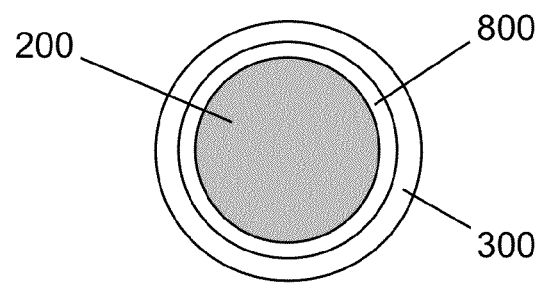
FIG. 7C is a cross-sectional view in a transverse plane of the present invention.
Figure 7B:
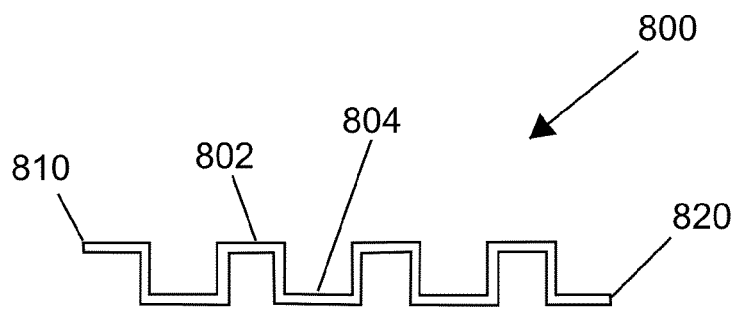
FIG. 7B is a cross-sectional view in a transverse plane of the shim member of the present invention.
Figure 7A:
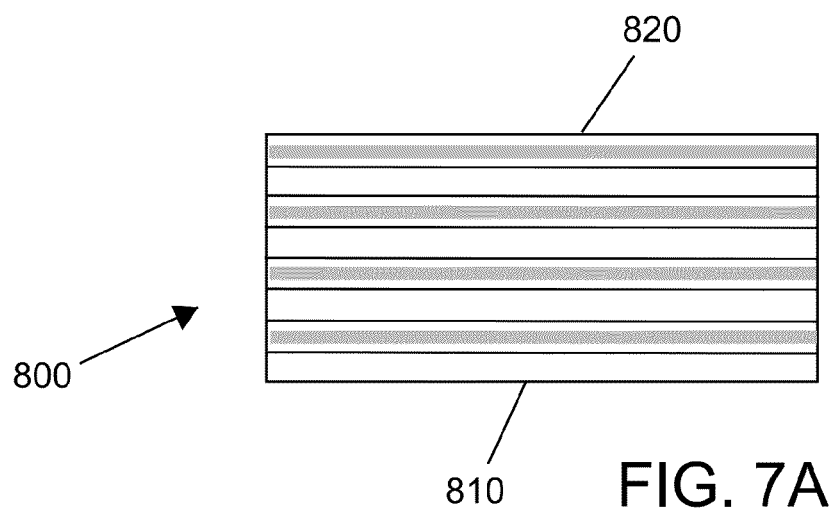
FIG. 7A is a top view of the shim member of the present invention.

Following is a list of elements corresponding to a particular element referred to herein:

100 Gripping system
200 Handle
210 Handle exterior surface
300 Gripping wrap
310 Wrap top surface
320 Wrap bottom surface
330 Wrap thickness
340 Wrap first edge
350 Wrap second edge
360 Wrap third edge
370 Wrap fourth edge
400 Ridge
410 Channel
440 Gripping aid
610 First linear bulge
620 Second linear bulge
700 Binding component
710 Binding component first edge
720 Binding component second edge
730 First pocket
740 Second pocket 800 Shim member
802 shim ridge
804 shim channel
810 Shim member first edge
820 Shim member second edge
910 First attachment component
920 Second attachment component Referring now to FIG. 1-7C, the present invention features a gripping system (100) for a handle (200). In some embodiments, the system (100) comprises a handle (200) having a handle exterior surface (210).

In some embodiments, the system (100) comprises an elastomeric flexible gripping wrap (300) having an elongated planar wrap top surface (310), a planar wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350).

In some embodiments, the gripping wrap (300) comprises a plurality of outwardly protruding ridges (400) arranged in rows longitudinally located on the wrap bottom surface (320) from the wrap first edge (340) to the wrap third edge (360), and the height of each of the ridges (400) protruding outwardly from the plane of the wrap bottom surface (320).

In some embodiments, the gripping wrap (300) comprises a plurality of inwardly protruding channels (410) longitudinally located on the wrap bottom surface (320) from the wrap first edge (340) to the wrap third edge (360), and the depth of each of the channels (410) protruding inwardly from the plane of the wrap bottom surface (320).

In some embodiments, the gripping wrap (300) comprises a first linear bulge (610) located on the wrap second edge (350). In some embodiments, the first linear bulge (610) runs at least partial a length of the wrap second edge (350). In some embodiments, the gripping wrap (300) comprises a second linear bulge (620) located on the wrap fourth edge (370). In some embodiments, the second linear bulge (620) runs at least partial a length of the wrap fourth edge (370).

In some embodiments, the first linear bulge (610) or the second linear bulge (620) is cylindrical. In some embodiments, the first linear bulge (610) or the second linear bulge (620) is angular. In some embodiments, the first linear bulge (610) is a first attachment component (910) and the second linear bulge (620) is a second attachment component (920).

In some embodiments, the gripping wrap (300) comprises a first attachment component (910) disposed on the wrap second edge (350). In some embodiments, the first attachment component (910) runs at least partial a length of the wrap second edge (350).

In some embodiments, the gripping wrap (300) comprises a second attachment component (920) disposed on the wrap fourth edge (370). In some embodiments, the second attachment component 9920) runs at least partial a length of the wrap fourth edge (370).

In some embodiments, the system (100) comprises a linear binding component (700) having a binding component first edge (710) and a binding component second edge (720). In some embodiments, an open first pocket (730) is located on the binding component first edge (710) and an open second pocket (740) is located on the binding component second edge (720). In some embodiments, the first pocket (730) faces outward. In some embodiments, the second pocket (740) faces outward opposed to the first pocket (730). In some embodiments, the first pocket (730) is complementary to the structure of the first linear bulge (610) and the second pocket (740) is complementary to the structure of the second linear bulge (620). In some embodiments, the linear binding component (700) is concave on a bottom surface and convex on a top surface.

In some embodiments, the gripping wrap (300) is located on and flexibly covers at least a portion of the handle exterior surface (210). In some embodiments, the first linear bulge (610) is inserted into the first pocket (730) and the second linear bulge (620) is inserted into the second pocket (740) such that the first pocket (730) wraps around and encases the first linear bulge (610) and the second pocket (740) wraps around and encases the second linear bulge (620). In some embodiments, the gripping wrap (300) is secured via the binding component (700).

In some embodiments, the system (100) further comprises a shim member (800). In some embodiments, the shim member (800) comprises a plurality of outwardly protruding shim ridges (802) and alternately inwardly protruding channels, arranged in rows longitudinally located on the shim member (800) from a shim member first edge (810) to a shim member second edge (820). In some embodiments, shim channels (804) are located opposite the shim ridges (802).

In some embodiments, the shim member first edge (810) comprises a partial shim ridge (802) located thereon. In some embodiments, the opposing shim member second edge (820) comprises a partial shim channel (804) located thereon. In some embodiments, the shim member (800), when wrapped, comprises overlapping edges. In some embodiments, the shim member second edge (820) overlaps and wraps over the shim member first edge (810).

In some embodiments, the shim member (800) is located on and flexibly covers at least a portion of the handle exterior surface (210). In some embodiments, the gripping wrap (300) is located on and flexibly covers at least a portion of the shim member (800). In some embodiments, the shim member (800) is adapted to provide a shim underneath the gripping wrap (300). In some embodiments, the gripping system (100) for the handle (200) is adapted to provide gripping stability and comfort for a user.

Alternate Embodiment of the System Featuring First and Second Recessed Ledges.

In some embodiments, the gripping system (100) for the handle (200) is adapted to provide gripping stability and comfort for a user.

In some embodiments, the system (100) comprises a cylindrical handle (200) having a handle exterior surface (210).

In some embodiments, the system (100) comprises a flexible gripping wrap (300) having a wrap top surface (310), a wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350). In some embodiments, the gripping wrap (300) comprises a plurality of outwardly protruding ridges (400) located on the wrap bottom surface (320) from the wrap first edge (340) to the wrap third edge (360). In some embodiments, the gripping wrap (300) comprises a plurality of inwardly protruding channels (410) located on the wrap bottom surface (320) from the wrap first edge (340) to the wrap third edge (360).

In some embodiments, the gripping wrap (300) comprises a first recessed ledge located on an intersection of the wrap top surface (310) and the wrap second edge (350). In some embodiments, the gripping wrap (300) comprises a second recessed ledge located at an intersection of the wrap bottom surface (320) and the wrap fourth edge (370). In some embodiments, the gripping wrap (300) is located on and flexibly covers at least a portion of the handle exterior surface (210). In some embodiments, the second recessed ledge is adapted to overlay and interfaceably attach to the first recessed ledge. In some embodiments, the gripping system (100) for the handle (200) is adapted to provide gripping stability and comfort for a user.

In some embodiments, the gripping wrap (300) comprises a first projection located on an intersection of the wrap top surface (310) and the wrap second edge (350). In some embodiments, the gripping wrap (300) comprises a second projection located at an intersection of the wrap bottom surface (320) and the wrap fourth edge (370). In some embodiments, the gripping wrap (300) is located on and flexibly covers at least a portion of the handle exterior surface (210). In some embodiments, the wrap bottom surface (320) having the first projection is adapted to wrap around at least a portion of and contact the handle exterior surface (210). In some embodiments, the second projection is adapted to slidably insert underneath the first projection against the handle (200) sliding past a first projection ledge and be held into place via tension interlocking a second projection ledge against the first projection ledge. In some embodiments, a cross-section of the first projection and the second projection comprises a first planar side, a second planar side, and a third radial side. In some embodiments, the first planar side is the first projection ledge or the second projection ledge.

Alternate Embodiment of the System Featuring Cylindrical Pockets.

In some embodiments, the gripping wrap (300) comprises a plurality of cylindrical pockets located on the wrap second edge (350) and a plurality of cylindrical pockets located on the wrap fourth edge (370). In some embodiments, a first aperture is centrally located on a flat cylindrical pocket first end and a second aperture is centrally located on a flat pocket second end. In some embodiments, the first aperture is fluidly connected to the second aperture through the cross section of the cylindrical pocket. In some embodiments the plurality of cylindrical pockets located on the wrap second edge (350) and the plurality of cylindrical pockets located on the wrap fourth edge (370) are offset from one another, so that when the gripping wrap (300) is rolled into a cylindrical shape (around the handle (200)), the plurality of cylindrical pockets on the wrap second edge (350) align with the cylindrical pockets on the wrap fourth edge (370) so that a locking rod may slidably pass through the first aperture and second aperture of each sequential cylindrical pocket. In some embodiments, the gripping wrap (300) is located on and flexibly covers at least a portion of the handle exterior surface (210). In some embodiments, the wrap bottom surface (320) is adapted to wrap around at least a portion of and contact the handle exterior surface (210).

In some embodiments, the locking rod is cylindrical and elongated.

In some embodiments, the gripping wrap (300) is rectangular.

In some embodiments, the gripping wrap (300) is constructed from a rubber. In some embodiments, the gripping wrap (300) is constructed from a silicone rubber. In some embodiments, the gripping wrap (300) is constructed from a plastic. In some embodiments, the gripping wrap (300) is constructed from an elastomeric material. In some embodiments, the gripping wrap (300) is constructed from a foam.

In some embodiments, the wrap top surface (310) comprises a gripping aid (440). In some embodiments, the gripping aid (440) comprises ridges (400). In some embodiments, the gripping aid (440) comprises a textured surface.

In some embodiments, the wrap bottom surface (320) comprises an adhesive component located thereon. In some embodiments, the first recessed ledge comprises an adhesive component located thereon. In some embodiments, the second recessed ledge comprises an adhesive component located thereon.

In some embodiments, the first recessed ledge comprises a magnetic component located thereon. In some embodiments, the second recessed ledge comprises a magnetic component located thereon.

Alternate Embodiment of the System Featuring Binding Component.

In some embodiments, the system has a gripping wrap (or a sheet) with a wrap top surface (or a sheet top surface), a wrap bottom surface (or a sheet bottom surface) with a friction enhancing interface, a wrap first edge, a wrap second edge with a second edge connecting member, a wrap third edge, and a wrap fourth edge with a fourth edge connecting member. In some embodiments, the system further has a binding component with a binding component first edge and a binding component second edge.

In some embodiments, the gripping wrap is wrapped around a handle, where the binding component first edge slides into or onto the second edge connecting member, and the binding component second edge slides into or onto the fourth edge connecting member. The gripping wrap is held into place around the handle via the binding component.

In some embodiments, the gripping wrap is generally rectangular. In some embodiments, the gripping wrap can be trimmed to fit. In some embodiments, the gripping wrap is polygonal, for example, hexagonal.

In some embodiments, the gripping wrap has a thickness from 0" to ¼". In some embodiments, the gripping wrap has a thickness from ¼" to ½".

In some embodiments, the gripping wrap is constructed from a rubber or silicone rubber. In some embodiments, the gripping wrap is constructed from a plastic. In some embodiments, the gripping wrap is constructed from a spongy material. In some embodiments, the gripping wrap is constructed from a pliable material. In some embodiments, the gripping wrap is constructed from an elastic material.

In some embodiments, the gripping wrap can be shrunk upon application of a heat source.

In some embodiments, the wrap top surface has a gripping aid. In some embodiments, the wrap bottom surface has a gripping aid. In some embodiments, the gripping aid has ridges. In some embodiments, the gripping aid has channels. In some embodiments, the gripping aid has a textured surface. In some embodiments, the gripping aid has an embossed surface. In some embodiments, the gripping aid has a raised surface. In some embodiments, the gripping aid interfaces with the hand of the user.

In some embodiments, the wrap bottom surface has an adhesive component.

In some embodiments, the friction enhancing interface has one or more ridges. In some embodiments, the friction enhancing interface has one or more grooves.

In some embodiments, the second edge connecting member has a generally round cross-section. In some embodiments, the second edge connecting member has a generally polygonal cross-section. In some embodiments, the second edge connecting member has a generally arrow-shaped cross-section. In some embodiments, the second edge connecting member has a generally one-half arrow-shaped cross section.

In some embodiments, the second edge connecting member has a generally flat mating surface. In some embodiments, the second edge connecting member has an adhesive component. In some embodiments, the second edge connecting member has a magnetic component.

In some embodiments, the fourth edge connecting member has a generally round cross-section. In some embodiments, the fourth edge connecting member has a generally polygonal cross-section. In some embodiments, the fourth edge connecting member has a generally arrow-shaped cross-section. In some embodiments, the fourth edge connecting member has a generally one-half arrow-shaped cross section.

In some embodiments, the fourth edge connecting member has a generally flat mating surface. In some embodiments, the fourth edge connecting member has an adhesive component. In some embodiments, the fourth edge connecting member has a magnetic component.

In some embodiments, the binding component is constructed from a rubber. In some embodiments, the binding component is constructed from a plastic. In some embodiments, the binding component is constructed from a metal.

In some embodiments, the binding component first edge has a first side complementary receiving member to receive the second edge connecting member. In some embodiments, the first side complementary receiving member has a hollow channel that slidably attaches to the second edge connecting member. In some embodiments, the hollow channel mates to the second edge connecting member.

In some embodiments, the binding component second edge has a second side complementary receiving member to receive the fourth edge connecting member. In some embodiments, the second side complementary receiving member has a hollow channel that slidably attaches to the fourth edge connecting member. In some embodiments, the hollow channel mates to fourth edge connecting member.

In some embodiments, the length of the wrap second edge is between 0" and 6". In some embodiments, the length of the wrap second edge is between 6" and 12". In some embodiments, the length of the wrap second edge is between 12" and 24". In some embodiments, the length of the wrap second edge is greater than 24".

In some embodiments, the length of the wrap fourth edge is between 0" and 6". In some embodiments, the length of the wrap fourth edge is between 6" and 12". In some embodiments, the length of the wrap fourth edge is between 12" and 24". In some embodiments, the length of the wrap fourth edge is greater than 24".

In some embodiments, the width of the gripping wrap measured from the wrap second edge to the wrap fourth edge is between 0" and 6". In some embodiments, the width of the gripping wrap measured from the wrap second edge to the wrap fourth edge is between 6" and 12". In some embodiments, the width of the gripping wrap measured from the wrap second edge to the wrap fourth edge is between 12" and 24". In some embodiments, the width of the gripping wrap measured from the wrap second edge to the wrap fourth edge is greater than 24".

As used herein, the term "about" refers to plus or minus 10% of the referenced number. For example, an embodiment wherein the handle is about 10 inches in length includes a handle that is between 9 and 11 inches in length.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A gripping system (100) for a handle (200), wherein said system (100) comprises:
   (a) a handle (200) having a handle exterior surface (210);
   (b) an elastomeric flexible gripping wrap (300) having an elongated planar wrap top surface (310), a planar wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350),
   wherein the gripping wrap (300) comprises a plurality of outwardly protruding ridges (400) arranged in rows longitudinally disposed on the wrap bottom surface (320) from the wrap first edge (340) to the wrap third edge (360), and the height of each of said ridges (400) protruding outwardly from the plane of said wrap bottom surface (320),
   wherein the gripping wrap (300) comprises a plurality of inwardly protruding channels (410) longitudinally disposed on the wrap bottom surface (320) from the wrap first edge (340) to the wrap third edge (360), and the depth of each of said channels (410) protruding inwardly from the plane of said wrap bottom surface (320),
   wherein the gripping wrap (300) comprises a first linear bulge (610) disposed on the wrap second edge (350), wherein the first linear bulge (610) runs at least partial a length of the wrap second edge (350),
   wherein the gripping wrap (300) comprises a second linear bulge (620) disposed on the wrap fourth edge (370), wherein the second linear bulge (620) runs at least partial a length of the wrap fourth edge (370); and
   (c) a linear binding component (700) having a binding component first edge (710) and a binding component second edge (720), wherein an open first pocket (730) is disposed on the binding component first edge (710) and an open second pocket (740) is disposed on the binding component second edge (720), wherein the first pocket (730) faces outward, wherein the second pocket (740) faces outward opposed to the first pocket (730), wherein the first pocket (730) is complementary to the structure of the first linear bulge (610) and the second pocket (740) is complementary to the structure of the second linear bulge (620);
   wherein the gripping wrap (300) is disposed on and flexibly covers at least a portion of the handle exterior surface (210), wherein the first linear bulge (610) is retainably inserted into the first pocket (730) and the second linear bulge (620) is retainably inserted into the second pocket (740) such that the first pocket (730) wraps around and encases the first linear bulge (610) and the second pocket (740) wraps around and encases the second linear bulge (620), wherein the gripping wrap (300) is secured via the binding component (700); wherein the gripping system (100) for the handle (200) is adapted to provide gripping stability and comfort for a user.

2. The system (100) of claim 1, wherein the gripping wrap (300) is rectangular.

3. The system (100) of claim 1, wherein the gripping wrap (300) is constructed from a rubber.

4. The system (100) of claim 1, wherein the gripping wrap (300) is constructed from a silicone rubber.

5. The system (100) of claim 1, wherein the gripping wrap (300) is constructed from a plastic.

6. The system (100) of claim 1, wherein the gripping wrap (300) is constructed from a foam.

7. The system (100) of claim 1, wherein the wrap top surface (310) comprises a gripping aid (440).

8. The system (100) of claim 7, wherein the gripping aid (440) comprises ridges (400).

9. The system (100) of claim 7, wherein the gripping aid (440) comprises a textured surface.

10. The system (100) of claim 1, wherein the wrap bottom surface (320) comprises an adhesive component disposed thereon.

11. The system (100) of claim 1, wherein the system (100) further comprises a shim member (800) for filling a gap between the gripping wrap (300) and the handle (200), wherein the shim member (800) comprises a plurality of outwardly protruding shim ridges (802) and alternately inwardly protruding shim channels (804), arranged in rows longitudinally disposed on the shim member (800) from a shim member first edge (810) to a shim member second edge (820),
 wherein the shim channels (804) are disposed opposite the shim ridges (802),
 wherein the shim member first edge (810) comprises a partial shim ridge (802) disposed thereon, wherein the opposing shim member second edge (820) comprises a partial shim channel (804) disposed thereon, wherein the shim member (800), when wrapped, comprises overlapping edges, wherein the shim member second edge (820) overlappingly wraps over the shim member first edge (810);
 wherein the shim member (800) is disposed on and flexibly covers at least a portion of the handle exterior surface (210), wherein the gripping wrap (300) is disposed on and flexibly covers at least a portion of the shim member (800), wherein the shim member (800) is adapted to provide a shim underneath the gripping wrap (300), wherein the gripping system (100) for the handle (200) is adapted to provide gripping stability and comfort for a user.

12. A gripping system (100) for a handle (200), wherein said system (100) consists of:
 (a) a handle (200) having a handle exterior surface (210);
 (b) an elastomeric flexible gripping wrap (300) having an elongated planar wrap top surface (310), a planar wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350),
 wherein the gripping wrap (300) consists of a plurality of outwardly protruding ridges (400) arranged in rows longitudinally disposed on the wrap bottom surface (320) from the wrap first edge (340) to the wrap third edge (360), and the height of each of said ridges (400) protruding outwardly from the plane of said wrap bottom surface (320),
 wherein the gripping wrap (300) consists of a plurality of inwardly protruding channels (410) longitudinally disposed on the wrap bottom surface (320) from the wrap first edge (340) to the wrap third edge (360), and the depth of each of said channels (410) protruding inwardly from the plane of said wrap bottom surface (320),
 wherein the gripping wrap (300) consists of a first linear bulge (610) disposed on the wrap second edge (350), wherein the first bulge runs at least partial a length of the wrap second edge (350),
 wherein the gripping wrap (300) consists of a second linear bulge (620) disposed on the wrap fourth edge (370), wherein the second linear bulge (620) runs at least partial a length of the wrap fourth edge (370); and
 (c) a linear binding component (700) having a binding component first edge (710) and a binding component second edge (720), wherein an open first pocket (730) is disposed on the binding component first edge (710) and an open second pocket (740) is disposed on the binding component second edge (720), wherein the first pocket (730) faces outward, wherein the second pocket (740) faces outward opposed to the first pocket (730), wherein the first pocket (730) is complementary to the structure of the first linear bulge (610) and the second pocket (740) is complementary to the structure of the second linear bulge (620);
wherein the gripping wrap (300) is disposed on and flexibly covers at least a portion of the handle exterior surface (210), wherein the first linear bulge (610) is retainably inserted into the first pocket (730) and the second linear bulge (620) is retainably inserted into the second pocket (740) such that the first pocket (730) wraps around and encases the first linear bulge (610) and the second pocket (740) wraps around and encases the second linear bulge (620), wherein the gripping wrap (300) is secured via the binding component (700);
wherein the gripping system (100) for the handle (200) is adapted to provide gripping stability and comfort for a user.

\* \* \* \* \*